United States Patent Office 3,082,103
Patented Mar. 19, 1963

3,082,103
STABLE COLLOIDAL DISPERSIONS AND METHOD OF PREPARING SAME
Eugene Wainer, Cleveland Heights, Ohio, assignor to Horizons Incorporated, Cleveland, Ohio, a corporation of New Jersey
No Drawing. Filed Nov. 12, 1959, Ser. No. 852,178
16 Claims. (Cl. 106—55)

This invention relates to a method of preparing colloidal dispersions of inorganic materials, characterized by an enhanced stability, and to the resulting products. More particularly, it involves the preparation of stable sols in which the starting raw materials have been subjected to substantial heat treatment prior to transformation into colloidal form.

A recently discovered procedure for producing fibers by controlled evaporation of dilute colloids is described in the following copending patent applications: Serial No. 777,193, filed December 1, 1958, and Serial No. 829,220, filed July 24, 1959. As therein disclosed, the sols employed were those commercially available in which ionic agents which usually cause precipitation have been removed through dialysis. At least temporarily, a relatively stable sol is thus produced which was found to be capable of producing fibers by techniques described in the aforesaid patent applications.

There are several disadvantages to the use of this type of starting materials in the fibering process. First of all, stable sols produced by dialysis and still suitable for the fibering process are usually exceptionally dilute. Generally speaking, concentrations of the order of 0.5 to 2% of solid oxide is about the maximum that can be obtained with such sols with any degree of stability in the fibering process even when a protective material has been added in a considerable amount. In addition, such colloids are extraordinarily sensitive to the presence of minute traces of coagulating agents. It has been found that with sols having a tendency to coagulate, the fibering process is highly inefficient. In many cases, heat or reduced temperatures alone are sufficient to cause coagulation and to prevent the formation of fibers entirely. It has also been found that if the colloidal dispersion can be maintained in pH's which represent extremes, that is, at a relatively alkaline pH or relatively acid pH, the fibering process is accelerated but, in general, it is not possible to maintain stability of many colloidal dispersions at such pH's. Finally, in the usual presently known sols, protective agents are generally added to a sol prepared by dialysis, and in most cases these protective agents interfere with the fibering process. It is not clear why such protective agents, generally of a colloidal nature, should have this effect, but the experimentally observed fact is that they do. Normally, the conditions for maintaining the stability of a sol in colloidal form are highly precise when formed by the usual techniques of dialysis, ion exchange, and the like. In the fibering process referred to and as described in the copending patent applications listed above, a variety of approaches are described which involve variously the addition of strongly ionized chemicals, heat, and the like. In order for the sol to be effective for fibering purposes, it must not coagulate or precipitate as a result of any chemical or physical treatment prior to the completion of the formation of the fiber. Generally the more concentrated the sol, the more susceptible the sol is to this adverse coagulation phenomenon. For example, sols are usually readily coagulated by the addition of strongly ionized chemicals, by the application of heat, or by freezing, or combinations of such treatments. The method utilized in handling the slots of the previous copending applications was to minimize these adverse effects by utilizing the sol in highly dilute form.

It is therefore an object of this invention to devise techniques which permit stable dispersions to be produced over broad ranges of pH, particularly on the acid side and on the alkaline side, and thus substantially away from neutral, and which are relatively concentrated.

It is a further object of this invention to provide a means for producing colloidal dispersions in which the basic raw materials may be peptized either with acid or with alkali and particularly in the presence of an acid salt or an alkaline salt of the oroginal material. In this manner, the use of protective agents which have an undesirable effect on the fibering process but which are normally required for stabilization of the sol is avoided.

It is a further object of the invention to provide concentrated sols having a concentration of solid oxide of the order of 20% to 30% by weight without the need for the high amount of peptizing agents normally required for the stabilization of a sol of this concentration.

I have found that stable sols particularly useful in the fibering process may be produced with relatively high concentrations by the following procedure. First a hydrated material or hydrated oxide is precipitated in gel form and then washed thoroughly to eliminate the ions required for precipitation and then heated rapidly to a temperature below the glow point and also below that which produces a distinct crystalline X-ray pattern, but nevertheless sufficient to effect elimination of the major portion of the water, and finally the resulting product is ground with a suitable peptizing agent. The peptizing agents may be certain alkaline agents, such as amonium carbonate, or such acids as acetic, citric, or hydrochloric, but preferably they are acid salts of the oxide which has been originally utilized in the process.

In a preferred procedure, the gelatinous precipitate formed in the first step of my process is produced by precipitating a salt such as the acetate or the chloride with ammonium hydroxide or ammonium carbonate or a mixture of the two. The gelatinous precipitate is then filtered, and then washed free of the precipitating ions. Thereafter the washed precipitate is pressed as dry as possible on the filter prior to heating. The hydrates are then heated fairly rapidly to a temperature below that at which the last remaining portions of adsorbed or chemically combined water are finally eliminated completely and above that at which all free water may be eliminated. The temperature of heating is a function of the particular oxide being utilized and as indicated before, it is important that heating be continued to a point not longer than a time short of being able to establish crystallinity by normal X-ray techniques. In the case of zirconium hydrate, for example, precipitated as above described, the maximum temperature to which the hydrate can be heated is approximately 325° C. and the optimum temperature is in the range of 225° to 275° C. for about one hour. In the case of aluminum hydrate, the temperature of dehydration does not exceed a maximum of 275° C. and the optimum is between 125° and 150° C. In the case of iron hydrate, the maximum temperature which can be utilized for the purpose is approximately 80° C. In the case of hydrous chromium oxide, the maximum temperature not to be exceeded is of the order of 325° C. and the optimum temperature is between 200 and 250° C.

After cooling to room temperature, freshly heated hydrated oxide is mixed with a suitable quantity of peptizing agent and then ground in a ball mill and subsequently put through a colloid mill for complete dispersion. For example, in the case of the dried zirconium hydrate, solutions of zirconium oxychloride or zirconium acetate may be utilized as the peptizing agent and similar salts may be used for the other metals such as aluminum, chromium, iron, nickel, cobalt, manganese, thorium, beryllium, and the like. Mixtures of the chlorides and acetates may also be utilized as peptizing agents. After the material has been milled until all of the particles are less than 0.1 micron in size as determined by examination under a microscope, the slip is then put through a colloid mill to break up the remaining aggregates finally producing a stable colloidal dispersion of particles which are e.g. between about 20 and 30 millimicrons in diameter and which appear to remain in suspension substantially indefinitely. In this way, concentrations as high as 25% may be obtained in a stable dispersion and the particles are small enough so that a distinct X-ray pattern is not developed. While I do not wish to be bound by any specific theoretical explanation, it appears that the milling in the presence of the acid or the acid salt or the alkaline agent adsorbs a solvation layer on the surface of the particle which prevents crystal growth. It is a further requirement that the heating step be controlled so that at the conclusion of the heating step the partially dewatered hydrated oxide still contains significant amounts of water. After being subjected to the fibering treatment, this last amount of water is then removed by heat treatment at an elevated temperature.

In summary, in a preferred method a gel is first produced by the usual techniques of precipitation. This gel is then dried until the majority but not all of the water which is chemisorbed on the gel is removed. Immediately after the drying step, the material is ball milled in the presence of a peptizing agent which preferably consists of an acid salt or basic salt of the specific oxide or of an acid. Final treatment involves putting the material through a colloid mill for ultimate dipersion.

Other techniques may be utilized for the elimination of the water, than the above described heating. For example, after precipitation, the gel may be first washed with alcohol to eliminate water, and then washed in turn with ether and then with toluene or other suitable inexpensive nonaqueous aromatic liquid. Finally the liquid is removed at room temperature or by application of small amounts of heat. An extremely bulky product is produced which may be peptized and dispersed in the same manner as described above, namely by grinding with a suitable acid salt, acid, or base.

Dehydration may also be effected by heating the precipitated hydrated oxide in a steam autoclave and then suddenly relieving the pressure at the maximum temperature.

The following specific examples will serve to further illustrate my invention.

*Example 1*

Three hundred twenty-two grams of zirconium oxychloride octahydrate was dissolved in 3 liters of water. This solution was led slowly with stirring at room temperature into 2 liters of water containing 45 grams of ammonium carbonate and 55 grams of ammonium hydroxide liquor, said ammonium hydroxide liquor containing approximately 30% ammonia. After the mixing of the two solutions was complete, the dispersion was stirred vigorously for 30 minutes longer and the pH adusted to approximately 7.0 by the addition of a few drops of ammonia and the stirring was continued for another ten minutes. The reuslting gelatinous precipitate was filtered without washing, repulped in water, and washed finally with water containing 0.5% ammonia until the wash liquors showed no test for chloride ion. The filter cake was pressed dry on the filter and then heated at 250° C. for one hour. A hard, dense, somewhat translucent product was obtained in the form of chunks and the product was shown by X-ray analysis to be completely amorphous.

The weight of the product at this stage was approximately 140 grams indicating that about a mole of water was still held by the product. The solid was then mixed with 400 ccs. of water and 3 grams of zirconium oxychloride added to the mixture. The resulting composition was then ground in a porcelain ball mill for 24 hours after which time a somewhat translucent thin suspension was obtained. After putting the material thus obtained through a colloid mill, a colloidal suspension developed which was translucent and appeared to be indefinitely stable with respect to settling out.

Utilizing the resulting product, fibers of zirconia were produced by applying a thin (20 micron thick) layer of the dispersion to a clean glass plate and drying the layer in an oven maintained at a temperature in the range of 150° to 200° C., this step requiring 15 to 20 minutes. In this step, the last of the free water associated with the partially dehydrated zirconium hydrate is removed and fibers several inches long and having a section with a maximum dimension of about 15 microns were obtained. The fiber forms thus produced were then heat treated by placement in a furnace at room temperature, after which the temperature was raised to 700° C. in a period of about one hour and maintained at the higher temperature for 30 minutes. As rapidly as possible, after the heat soak at 700° C., the temperature was then increased to 1200° C. and maintained at this temperature for 15 minutes. The fibers were removed from the furnace and allowed to cool to room temperature. As a result of this heat treatment, the length of the fiber and the maximum width section was reduced by about 25% from the original dimension obtained at room temperature. The fibers were strong, tough, and under the microscope exhibited no evidences of crystallinity indicating that the particle size of the crystallites are below about 0.1 to 0.2 micron in finished form at least, this being the resolving power of the microscope.

Such fibers continue to show no evidences of crystal growth even though heat treated for periods of six hours at 1500° C. in air.

*Example 2*

The zirconium hydrate was prepared and dried as described in Example 1. The dried hydrate was again mixed with 400 ccs. of water plus 20 ccs. of zirconium acetate solution, said zirconium acetate solution containing approximately 16% zirconium oxide. Again after milling for 24 hours and passing through the colloid mill, a translucent, stable, colorless suspension was obtained exhibiting excellent fibering characteristics.

*Example 3*

The zirconium hydrate precipitate was prepared as described in Example 1. After filtering and after washing out the chloride ion, the hydrate was pulped in 1,000 ccs. of methyl alcohol and stirred for about 20 minutes, and then filtered. This repulping with ethyl alcohol was repeated twice. Ethyl ether was then utilized as the pulping agent and the treatment with ethyl ether was carried out twice. Finally, the material was pulped once with toluene and the filter cake was dried at 85° C. The resulting dried aerogel was mixed with 400 ccs. of water and 5 ccs. of glacial acetic acid, and was then subjected to the same ball milling and colloid mill treatment as before, and again a stable translucent suspension was obtained having excellent fibering characteristics.

*Example 4*

The washed gelatinous precipitate as described in Example 1 was again prepared. In this case, the hydrate was placed in a steam autoclave and the pressure in the autoclave raised to approximately 325 pounds per square inch at a temperature 220° C. Through a quick acting release valve, the pressure was brought down to atmospheric in approximately 30 seconds, and the product was cooled to room temperature. The resulting product was different than those made by drying at atmospheric pressure in that it retained its original bulk, and had a shimmery, somewhat translucent appearance. The material was mixed with 400 ccs. of water and 20 ccs. of zirconium acetate solution, said zirconium acetate solution containing 16% zirconium oxide by volume and again ball milled and passed through the colloid mill. As before, a stable suspension of excellent fibering characteristics was obtained.

*Example 5*

The zirconium hydrate was prepared and dried as in Example 1, and was ground with 50 ccs. of a 25% water solution of ammonium carbonate, and colloid milled as before. A stable translucent suspension yielding coarse long fibers was obtained.

*Example 6*

Two hundred seventy grams of hydrated ferric chloride were dissolved in three liters of water and led into two liters of a solution containing 60 grams of ammonium carbonate and 83 grams of ammonium hydroxide liquor containing 30% ammonia. The precipitation was carried out with vigorous stirring. After precipitation, the materal was digested with stirring at room temperature for 15 minutes and the pH was then adjusted to 7 by the addition of a few drops of ammonia. The material was then filtered and washed on the filter with water until no further test for chloride ion is obtained in the wash liquors. The precipitate was pressed as dry as possible and the water replaced with toluene as indicated in a previous example, namely, by first repulping with methyl alcohol, filtering, and then repulping with filtration twice more with methyl alcohol, followed by two successive pulpings and filterings with ether, and a final pulping with toluene. The aerogel obtained was then dried at 80° C. The material was then mixed with ten grams of ferric acetate and then ball milled with 650 ccs. of water, after which it was passed through the colloid mill as before. A red sol or colloidal suspension was obtained which exhibited excellent fibering characteristics.

*Example 7*

Two hundred forty grams of hydrated aluminum chloride was dissolved in 30 liters of water and led into two liters of the solution containing 60 grams of ammonium carbonate and 83 grams of ammonium hydroxide liquor of 30% ammonia grade. After precipitation and digestion, and adjustment of the pH to 7 with ammonia, the material was filtered and washed until free of chloride ion, after which the precipitate was dried for two hours at 125° C. The material was placed in a ball mill with 400 ccs. of water and 10 grams of aluminum triacetate and ground for twenty-four hours, and the final dispersion was completed by passage through a colloid mill. A colloidal suspension capable of producing fibers was obtained.

*Example 8*

Three hundred thirty grams of hydrated chromium chloride of formula $CrCl_3 \cdot 10H_2O$ was dissolved in three liters of water, and again precipitated by passage with stirring into two liters of solution containing 60 grams of ammonium carbonate and 83 grams of ammonium hydroxide of 17% ammonia grade. The precipitate after washing free of chloride ion was dried at 275° C. for two hours, mixed with 600 ccs. of water and 10 ccs. of glacial acetic acid, ground for twenty-four hours in a ball mill, and then passed through the colloid mill. A greenish gray colloidal suspension was obtained from which fibers are readily produced.

The fibering procedure, described in the above mentioned applications, consists in rapid removal of the residual water from thin films of colloidal dispersions, disposed on substrates to which they do not adhere.

By using the present improved technique for preparation of the dispersions, the fibers are produced in quantity with greater ease and with greater reproducibility.

I claim:

1. A method of preparing stable colloidal dispersion which comprises: precipitating a hydrated metal oxide in gel form; washing the precipitate until the washings are free of the ions used to effect precipitations; rapidly eliminating the major portion of the water associated with the washed precipitate and heating said precipitate to produce an amorphous non-crystalline and incompletely dried product and, after cooling said incompletely dried product to about room temperature, comminuting said product in the presence of freshly added peptizing agent and water to particles finer than about 0.1 micron, to peptize the product and to produce a peptized ceramic slip; and passing the ceramic slip through a colloid mill to reduce the size of the solid particles in said slip to below about 30 millimicrons, thereby producing a colloidal material which forms a stable colloidal dispersion.

2. The method of claim 1 wherein the freshly added peptizing agent is acidic.

3. The method of claim 2 wherein the freshly added peptizing agent is selected from the group consisting of acetic acid, citric acid, hydrochloric acid and acetates and chlorides of the inorganic oxide.

4. The method of claim 1 wherein the freshly added peptizing agent is alkaline.

5. The method of claim 4 wherein the freshly added peptizing agent is an alkaline ammonium salt.

6. The method of claim 5 wherein the freshly added peptizing agent is ammonium carbonate.

7. A method of preparing stable colloidal zirconia dispersions which comprises: precipitating a hydrated zirconium oxide in gel form, by adding an ammoniacal solution to an aqueous solution of a zirconium salt; thereafter washing the precipitate until the washings are free of the ions used to effect precipitation; rapidly eliminating the major portion of the water associated with the washed product and heating said precipitate to produce an amorphous non-crystalline and incompletely dried zirconia product and, after cooling said incompletely dried product to about room temperature, comminuting said product in the presence of freshly added peptizing agent and water to peptize the product and to produce a peptized ceramic slip; and passing the ceramic slip through a colloid mill to reduce the size of the solid particles in said slip to below about 30 millimicrons, thereby producing a colloidal material which forms a stable colloidal dispersion.

8. The method of claim 7 wherein the major portion of the water is physically separated from the washed product and then the remaining free water associated with the washed product is eliminated by rapidly heating the washed product to a temperature below that at which the last remaining portions of chemically combined water are completely eliminated and above that at which all free water may be eliminated and discontinuing the heating before the amorphous product is transformed into a crystalline product.

9. The method of claim 7 wherein the major portion of the water is eliminated by extraction successively with water miscible and water immiscible solvents.

10. A method of preparing stable colloidal dispersion of zirconia which comprises: dissolving zirconium oxychloride in water; adding ammonium carbonate thereby precipitating a hydrated inorganic oxide in gel form; washing the precipitate until the washings are free of the ion used to effect precipitation; filtering the washed precipitate; rapidly heating the washed product to between about 225° C. and 275° C. to rapidly eliminate the major portion of the water associated therewith and to produce an amorphous non-crystalline and incompletely dried product cooling the incompletely dried product and immediately thereafter comminuting said freshly prepared product in the presence of freshly added peptizing agent, comprising a solution of a compound of zirconium, to peptize said product and to produce a peptized ceramic slip passing the ceramic slip through a colloid mill to reduce the size of the solid particles in said slip to below about 30 millimicrons, thereby producing a colloidal material which forms a stable colloidal dispersion.

11. A method of preparing colloidal material which forms stable colloidal dispersions of an oxide of a metal selected from the group consisting of zirconium, aluminum, chromium, iron, nickel, cobalt, manganese, thorium and beryllium which comprises: mixing an aqueous solution of a salt of said metal with an aqueous solution of an ammonium compound; adjusting the pH of said solution and precipitating a hydrated oxide of said metal in gel form; filtering the mixture to separately recover the hydrated oxide gel; washing the recovered gel free of the ions of the original salt solution; separating the major portion of the water present in said washed product from said washed product; heating the resulting product sufficiently to produce an incompletely dried amorphous non-crystalline product; cooling the partly dried product to about room temperature and promptly thereafter wet milling said product in the presence of a small freshly added amount of a peptizing agent present in the solution from which the gel was precipitated to produce a peptized ceramic slip; and passing the ceramic slip through a colloid mill to reduce the size of the solid particles in said slip to below about 30 millimicrons.

12. The method of claim 11 wherein the metal salt is a chloride.
13. The method of claim 11 wherein the freshly added peptizing agent is an acetate.
14. The method of claim 11 wherein the salt is zirconium oxychloride and the freshly added peptizing agent is zirconium oxychloride.
15. The method of claim 11 wherein the salt is zirconium oxychloride and the freshly added peptizing agent is zirconium acetate.
16. The method of claim 11 wherein the salt is a chloride.

References Cited in the file of this patent

UNITED STATES PATENTS

| | | |
|---|---|---|
| 1,682,239 | Patrick | Aug. 28, 1929 |
| 2,156,904 | Ruthruff | May 2, 1939 |
| 2,358,202 | Behrman | Sept. 12, 1944 |
| 2,467,089 | Marisic | Apr. 12, 1949 |
| 2,560,707 | Stark | July 17, 1951 |
| 2,590,833 | Bechtold et al. | Apr. 1, 1952 |
| 2,898,217 | Selsing | Aug. 4, 1959 |
| 2,910,371 | Ryschkewitsch | Oct. 27, 1959 |
| 2,934,443 | Shell | Apr. 26, 1960 |